United States Patent
Ohba

(10) Patent No.: US 6,278,477 B1
(45) Date of Patent: Aug. 21, 2001

(54) IMAGE FORMING APPARATUS

(75) Inventor: Masahiro Ohba, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/504,579

(22) Filed: Feb. 15, 2000

(30) Foreign Application Priority Data

Feb. 17, 1999 (JP) .................................................. 11-039088

(51) Int. Cl.[7] .......................................................... B41J 2/47
(52) U.S. Cl. ............................................ 347/251; 347/240
(58) Field of Search ................................ 347/19, 14, 188, 347/189, 240, 251, 253, 254; 358/1.9, 504, 518; 382/162, 167; 399/39, 41, 49

(56) References Cited

U.S. PATENT DOCUMENTS

| | | | |
|---|---|---|---|
| 5,099,279 | * 3/1992 | Shimizu | 399/49 |
| 5,978,506 | * 11/1999 | Murayama et al. | 382/162 |
| 6,026,216 | * 2/2000 | Ohtsuka et al. | 358/1.9 |

* cited by examiner

Primary Examiner—N. Le
Assistant Examiner—Hai C. Pham
(74) Attorney, Agent, or Firm—Sughrue, Mion, Zinn Macpeak & Seas, PLLC

(57) ABSTRACT

An image forming apparatus having a colorimeter for measuring density or color of an image, and capable of carrying out calibration with high accuracy. In the image forming apparatus, a test image, and a first reference line and a second reference line for defining a position of the test image on an image receiving paper, are exposed and formed on a photosensitive material. The first reference line and the second reference line formed on the image receiving paper are detected by a reflective photosensor so that a position at which the test image is formed on the image receiving paper is automatically determined. As a result, test image data, which is stored in advance in the image receiving apparatus, and a measurement position, at which measurement is carried out by a colorimetry apparatus, can be made to correspond to each other accurately. Further, the colorimetry apparatus is built-in into the image forming apparatus, thus allowing a series of operations needed for calibration to be performed automatically.

18 Claims, 10 Drawing Sheets

F I G. 2
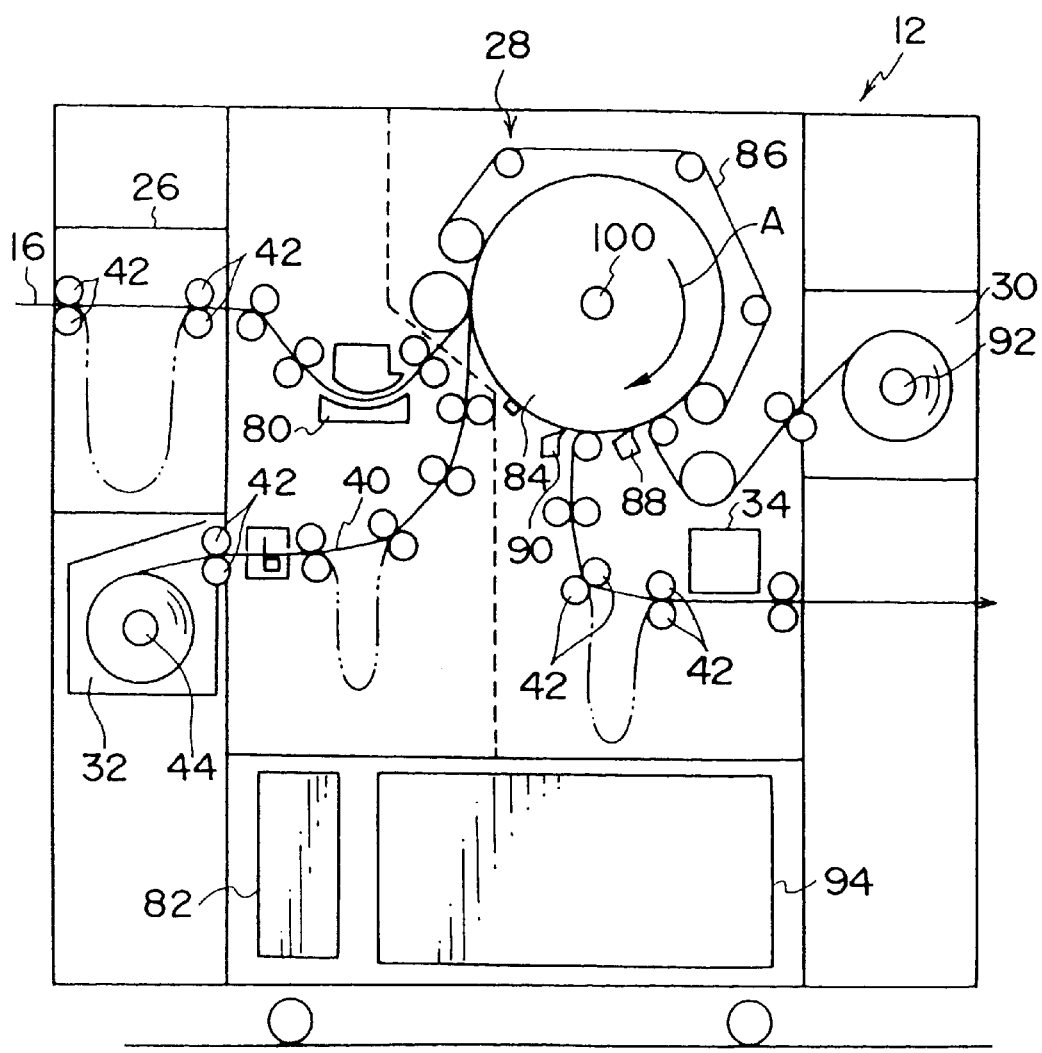

F I G. 3
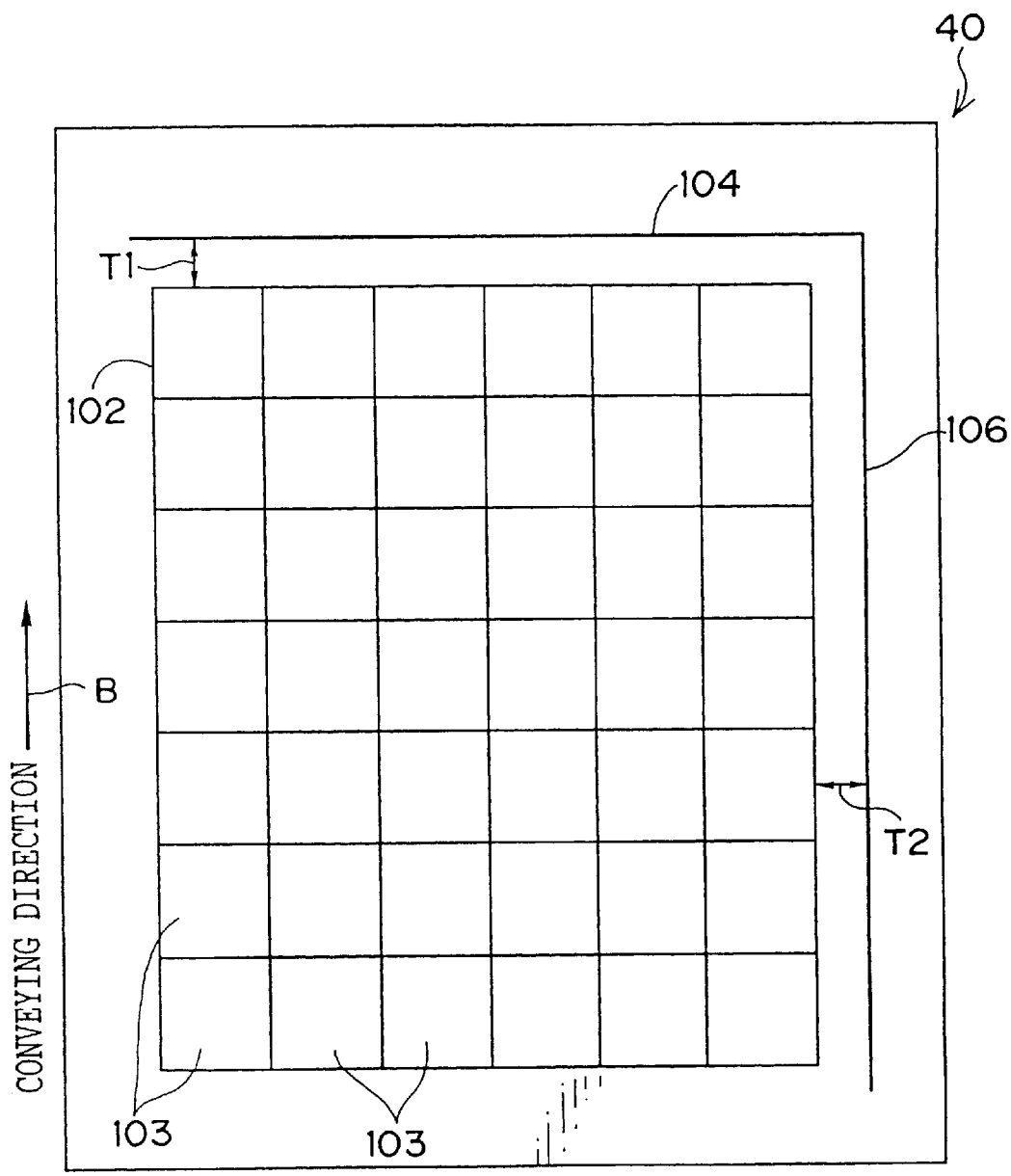

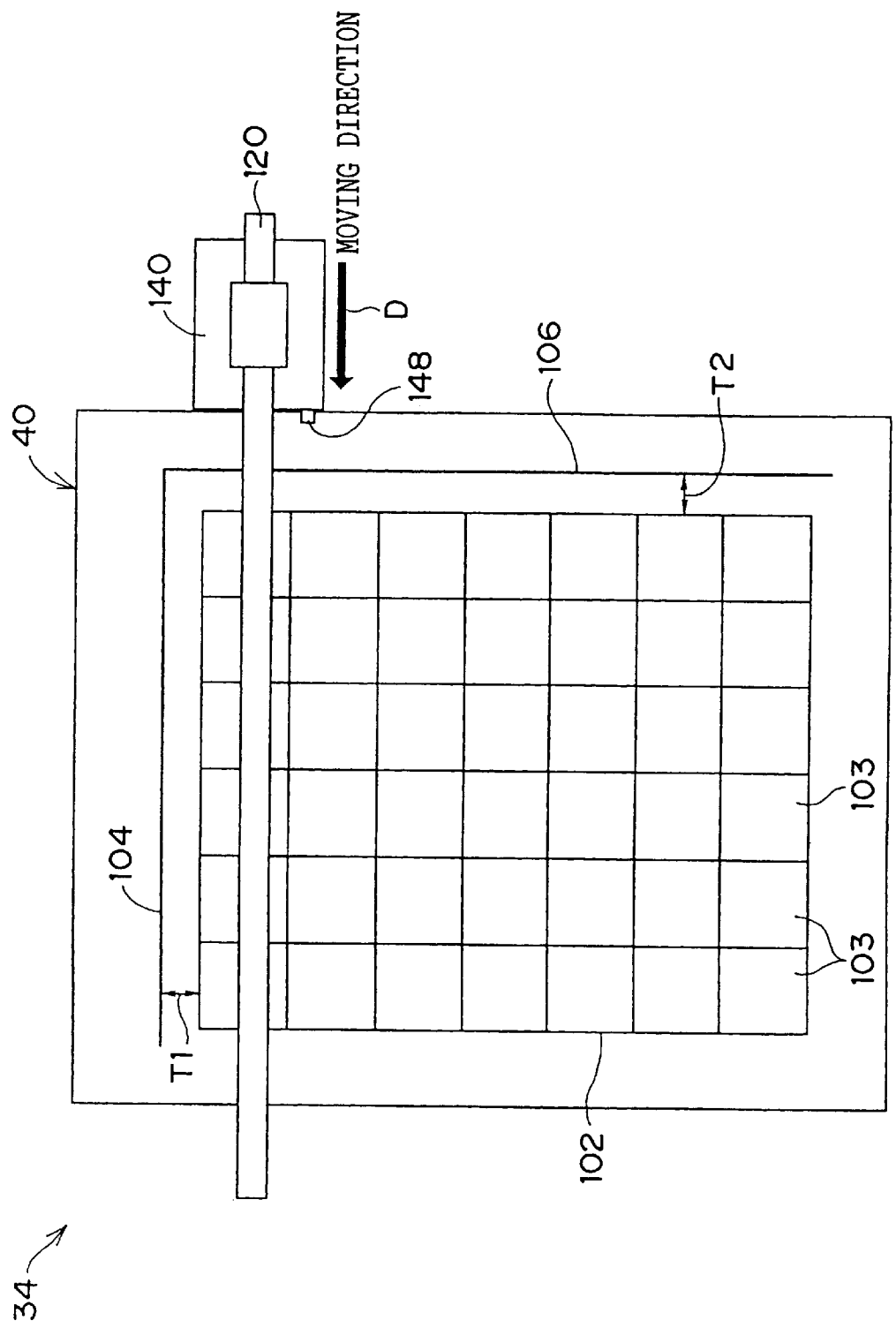

IMAGE FORMING APPARATUS

BACKGROUND OF THE INVENTION

1. Field of the Invention

The present invention relates to an image forming apparatus, and more particularly to an image forming apparatus equipped with a calibration function as follows. On the basis of test image data for calibration which is stored in advance in the image forming apparatus, a photosensitive material is irradiated with a light beam so as to be exposed. The photosensitive material and an image receiving material are superposed together and conveyed while contacting a heat-developing drum so as to be subjected to heat-developing processing. A test image is thereby formed on the image receiving paper. On the basis of this test image, the calibration function corrects density or color unevenness of the test image caused by non-uniformity of temperature at the surface of the heat-developing drum.

2. Description of the Related Art

Conventionally, there has been proposed an image forming apparatus by a heat-developing/transferring recording system in which a photosensitive material is irradiated with a laser beam on the basis of image data so as to be exposed. The exposed photosensitive material and an image receiving material are made to contact a heat-developing drum in a state of being superposed with each other, and are subjected to heat-developing processing. An image is thereby transferred onto the image receiving material.

With this image forming apparatus by the heat-developing/transferring recording system, there are cases in which there is non-uniformity of temperature in an axial direction of the heat-developing drum which performs the heat-developing processing. Such non-uniformity of temperature leads to density unevenness (color unevenness in a case of a color image) in the formed image. Namely, an image which should be expressed at a single density is formed on the image receiving paper at different densities which differ from each other in accordance with the position at which the image receiving paper contacts the heat-developing drum. As a result, it is impossible to obtain a high quality image. Further, there are cases in which density unevenness is caused due to changes in environmental temperature or humidity, or instrumental error, paper quality even in a laser printer, an ink jet printer, or the like.

Generally, reproducibility and stability of density are required, namely, an image whose density data is the same is desired to be formed at the same density. For this reason, calibration is of great importance in the image forming apparatus.

In order to perform calibration, test image data for calibration is usually stored in advance in the image forming apparatus.

In carrying out calibration in the image forming apparatus by the heat-developing/transferring recording system, for example, first, on the basis of the test image data, a test image which comprises a plurality of patches of different densities (colors in the case of color printing) is printed on an image recording material. The image recording material having this test image printed thereon is inserted into a calibrator which measures the density or the color of the printed test image. Further, in comparing results of this measurement with the test image data for calibration stored in advance in the apparatus, the position of the image recording material having the test image printed thereon and the position data of the test image data for calibration stored in advance (i.e., the address in the memory) are made to correspond to each other. Namely, an image writing position (the position at which a laser head which outputs a laser beam is disposed) and a processing position (where the heat-developing drum is disposed) are identified.

Thereafter, density (or color) unevenness is detected by comparing the results of measurement of the density or color, with data that corresponds to the measurement position of the test image stored in advance. Further, a correction value which offsets this density (or color) unevenness is computed. Then, during image forming processing after calibration, test image data which is stored in advance is corrected by using the computed correction value. On the basis of the corrected image data, the photosensitive material is irradiated with a light beam. Namely, the exposure amount for the photosensitive material is corrected on the basis of the position where the photosensitive material contacts the heat-developing drum during heat-developing processing, and density (or color) unevenness of an image to be formed, which unevenness is caused by non-uniformity of temperature at the surface of the heat-developing drum, is thereby corrected.

However, since the calibrator has conventionally been provided at an exterior of the image forming apparatus, each time when calibration is carried out, the calibrator must be set manually. Accordingly, there have been cases in which the position, at which the image recording material having the test image printed thereon is inserted into the calibrator, deviates from an accurate position. Further, the calibrator does not have a function of identifying the position where the image recording material having the test image printed thereon is inserted into the calibrator. Moreover, in the calibrator provided at the exterior of the image forming apparatus, there have been cases in which measurement errors are caused by the effect of external light or temperature difference inside or outside the image forming apparatus. If the image recording material having the test image printed thereon is not inserted into the calibrator at an accurate position, it is impossible to have the measurement position of the calibrator and position data of the test image data which is stored in advance correspond to each other accurately. As a result, deviation is caused between the position of measurement by the calibrator and the position where calibration is carried out (the position at which image data is exposed and which corresponds to a position where non-uniformity of temperature is caused at a surface of the heat-developing drum). Thus, highly-accurate calibration has not been realized by such a conventional image forming apparatus.

On the other hand, there has been adopted a method in which marks for detection are applied to the image recording material having the test image printed thereon so as to detect a conveying direction position of the image recording material having the test image formed thereon. However, in this case as well, since only the position, in the conveying direction, of the image recording material having the test image printed thereon has been identified, the image recording material having the test image printed thereon could only be aligned properly in an axial direction of the heat-developing drum by chance. Namely, the measurement position by the calibrator and the correction position could not correspond to each other exactly.

SUMMARY OF THE INVENTION

It is an object of the present invention to provide an image forming apparatus having a highly accurate calibration function which, on the basis of a test image which is recorded on a recording material in accordance with test image data for calibration which is stored in advance in a memory, is able to correct density unevenness or color unevenness of an image. The density or color unevenness is caused by environmental changes such as change of temperature/humidity, instrumental error, paper quality as a recording material, change of the recording materials with elapse of time, and the like, or specification difference. In the image forming apparatus of the present invention, an image is recorded on the recording material by each of recording systems such as a scanning and exposure system by irradiation of a laser beam, a recording system with ink jet spraying, a heat-developing/recording system in which an image is formed by performing heat-developing/transferring processing by laminating a photosensitive material and an image receiving material to each other, and the like.

A first aspect of the present invention is an image forming apparatus for forming an image on a recording material, having a calibration system, the calibration system comprising: storing means for storing test image data for calibration; image recording means for, on the basis of the test image data stored in advance by the storing means, recording a test image on the recording material; measuring means for measuring density or color of the test image recorded on the recording material by the image recording means; and correction means for, on the basis of the results of measurement by the measuring means, correcting density unevenness or color unevenness of the test image.

In accordance with the first aspect of the present invention, test image data for calibration is stored in advance in the storing means. In carrying out calibration, test image data is read from this storing means. On the basis of the test image data, a test image is recorded on the recording material by the recording means.

Density or color of the test image recorded on the recording material is measured by the measuring means. On the basis of the results of measurement by the measuring means, density unevenness or color unevenness is corrected by the correcting means.

In the first aspect of the present invention, since the image forming apparatus is equipped with all of the program made up of a software structure as well as a hardware structure which are necessary for such a calibration as described above, when calibration is carried out, it is unnecessary to prepare a measuring device separately. Further, since calibration is carried out within an ordinary conveying system, positioning of the recording material is thereby facilitated.

A second aspect of the present invention is an image forming apparatus according to the first aspect of the present invention, wherein the correcting means compares the results of measurement by the measuring means and the test image data stored in advance in the storing means for each of measuring positions at which density or color of the test image is measured, and determines a correction value of density unevenness or color unevenness at each measuring position.

According to the second aspect of the present invention, density or color of the test image is stored in advance in the storing means to be corresponded to a measurement position by the measuring means. Accordingly, a correction value can be determined at each of the measurement positions so that highly accurate correction of density unevenness or color unevenness can be performed.

A third aspect of the present invention is an image forming apparatus having a calibration function for correcting density or color unevenness of an image, caused by non-uniformity of temperature on a surface of a heat-developing drum, on the basis a test image which is recorded on a recording material in accordance with test image data for calibration: detecting means for detecting marks which are formed on the recording material and which specify a position of the test image; measuring means for, on the basis of the marks detected by the detecting means, measuring density or color of the test image formed on the recording material due to a correspondence between the test image formed on the recording material and position data of the test image data stored in advance in the storing means, to each other; and correcting means for correcting density unevenness or color unevenness of the test image by comparing the results of measurement by the measuring means with density or color of the test image stored in advance by the storing means.

According to the third aspect of the present invention, the detecting means detects marks which specify a position at which the test image is formed on the recording material. Since these marks are formed, together with the test image, on a recording material, the test image and the marks are always formed in the same relative positional relationship on the recording material.

On the basis of the detected marks, the measuring means determines the position of the test image which is formed on the recording material. Further, a position of the test image formed on the image recording material and position data of the test image data (the address in the memory at which the test image data is stored) are made to correspond to each other. Namely, the density or color of the test image formed on the recording material and the test image data which is stored in advance are made to correspond to each other.

The measuring means measures density or color of the test image formed on the image receiving material. The correction means compares the density or color measured by the measuring device and that of the test image data stored in the apparatus. On the basis of results of this comparison, the correction means corrects the density unevenness or color unevenness of the test image, which is caused by non-uniformity of temperature of the heat-developing drum.

The image forming apparatus has a calibration function (which is of software and hardware type). Accordingly, on the basis of an accurate correspondence between data measured by the measuring means and test image data used as reference data, to each other, a correction amount can be determined. As a result, a highly accurate calibration can be performed.

A fourth aspect of the present invention is an image forming apparatus according to the third aspect of the present invention, wherein mark data for recording the marks forms a part of the test image data.

According to the fourth aspect of the present invention, since mark data, together with test image data, is stored in the storing means, at least a relative positional relationship between the test image on the recording material and the marks can be ensured.

A fifth aspect of the present invention is an image forming apparatus according to the third aspect of the present invention, wherein a home position of the measuring means is determined due to a correspondence between the test image formed on the recording material and position data of the test image data stored in advance in the storing means, to each other.

According to the fifth aspect of the present invention, when the home position of the measuring means is determined, a subsequent movement of the measuring means can be controlled, for example, by a pulse encoder or the like.

A sixth aspect of the present invention is an image forming apparatus according to the third aspect of the present invention, wherein the measuring means is able to move in a direction orthogonal to a conveying direction of the recording material, and is moved in the direction orthogonal to the conveying direction of the recording material while conveying the recording material so that a test image is scanned.

According to the sixth aspect of the present invention, measurement by using the measuring means is performed only by scanning the image surface of the test image formed on the recording material. However, the ordinary conveyance of the recording material is used, and at the same time with this conveyance of the recording material, when the measuring means is made to carry out a reciprocating movement in a widthwise direction of the conveying direction of the recording material, the entire test image can be scanned in a narrower area than in a case in which only the measuring means moves in a direction of X-Y.

A seventh aspect of the present invention is an image forming apparatus according to the third aspect of the present invention, wherein the mark is at least one of a first mark formed along the conveying direction of the recording material and a second mark formed along the direction orthogonal to the conveying direction of the recording material.

An eighth aspect of the present invention is an image forming apparatus according to the seventh aspect of the present invention, wherein the home position of the measuring means is determined on the basis of the number of moving pulses generated by the detecting means when the first mark or the second mark is detected.

According to the seventh or eighth aspect of the present invention, marks are not limited to conventional registers (two lines intersecting to each other). However, it is apparent that a mark along the conveying direction of the recording material and a mark along the widthwise direction thereof can be used. Namely, both of the marks exist on the test image, like the conventional registers, it is possible to determine the home position of the measuring means by referring to the intersection point.

If one of the marks is used, the home position of the measuring means can be determined by using moving pulses generated by the detecting means in combination.

A ninth aspect of the present invention is an image forming apparatus according to the third aspect of the present invention, wherein the correcting means corrects an exposure amount of the recording material on the basis of the results of measurement by the measuring means.

According to the ninth aspect of the present invention, since the correcting means corrects the exposure amount of the recording material in place of correcting temperature during a developing processing which is an immediate cause of density unevenness or color unevenness. Accordingly, deterioration of image quality due to non-uniformity of temperature during image developing processing can be controlled more simply.

A tenth aspect of the present invention is an image forming apparatus according to the third aspect of the present invention, where in the image forming apparatus is a heat-developing/transferring apparatus in which a photosensitive material is irradiated with a light beam so as to be exposed, and in which the photosensitive material and an image receiving material are laminated to each other, and conveyed while contacting a heat-developing drum, thereby being subjected to heat-developing/transferring processing so that an image is formed on the image receiving material.

According to the tenth aspect of the present invention, in the heat-developing/transferring apparatus, the heat-developing/transferring processing is largely affected by temperature distribution on the surface of the heat-developing drum. For this reason, deterioration of image quality due to non-uniformity of temperature becomes noticeable. Accordingly, the third aspect of the present invention is applied so that control of the temperature on the developing drum can be made to be relatively rough. As a result, the control system can be simplified.

An eleventh aspect of the present invention is an image forming apparatus according to any one of third to tenth aspects of the present invention, wherein the mark is a line mark, and the detecting means has inclination measuring means for, on the basis of the first mark or the second mark, measuring inclination of the test image formed on the recording material with respect thereto, and if the inclination measured by the inclination measuring means is at least equal to a predetermined value, the detecting means stops the measurement by the measuring means and outputs information expressing that an error has occurred.

According to the eleventh aspect of the present invention, the detecting means has an inclination measuring means. This inclination measuring means measures inclination of the test image formed on the recording material with respect thereto. When inclination of the test image formed on the recording material with respect thereto is large, it is impossible to carry out accurate calibration.

If the inclination measured by the inclination measuring means is a predetermined value or more, the detecting device judges that the measuring means cannot perform accurate calibration, stops density or color measurement by the measuring means, and outputs information that an error has occurred. As a result, execution of inaccurate calibration due to inclination of the test image can be prevented.

As described above, the present invention provides an image forming apparatus which has a colorimeter for measuring density or color (i.e., calibration device), and which is capable of performing calibration with high accuracy.

BRIEF DESCRIPTION OF THE DRAWINGS

FIG. 2 is a structural view illustrating in detail the structure of a heat-developing apparatus according to the present embodiment.

FIG. 3 is a schematic view of a test image for calibration formed on an image receiving paper.

FIG. 10 is a schematic top view of the colorimetry apparatus and schematically illustrates a state in which the colorimeter detect a second reference line.

DESCRIPTION OF THE PREFERRED EMBODIMENT

Figure 1:
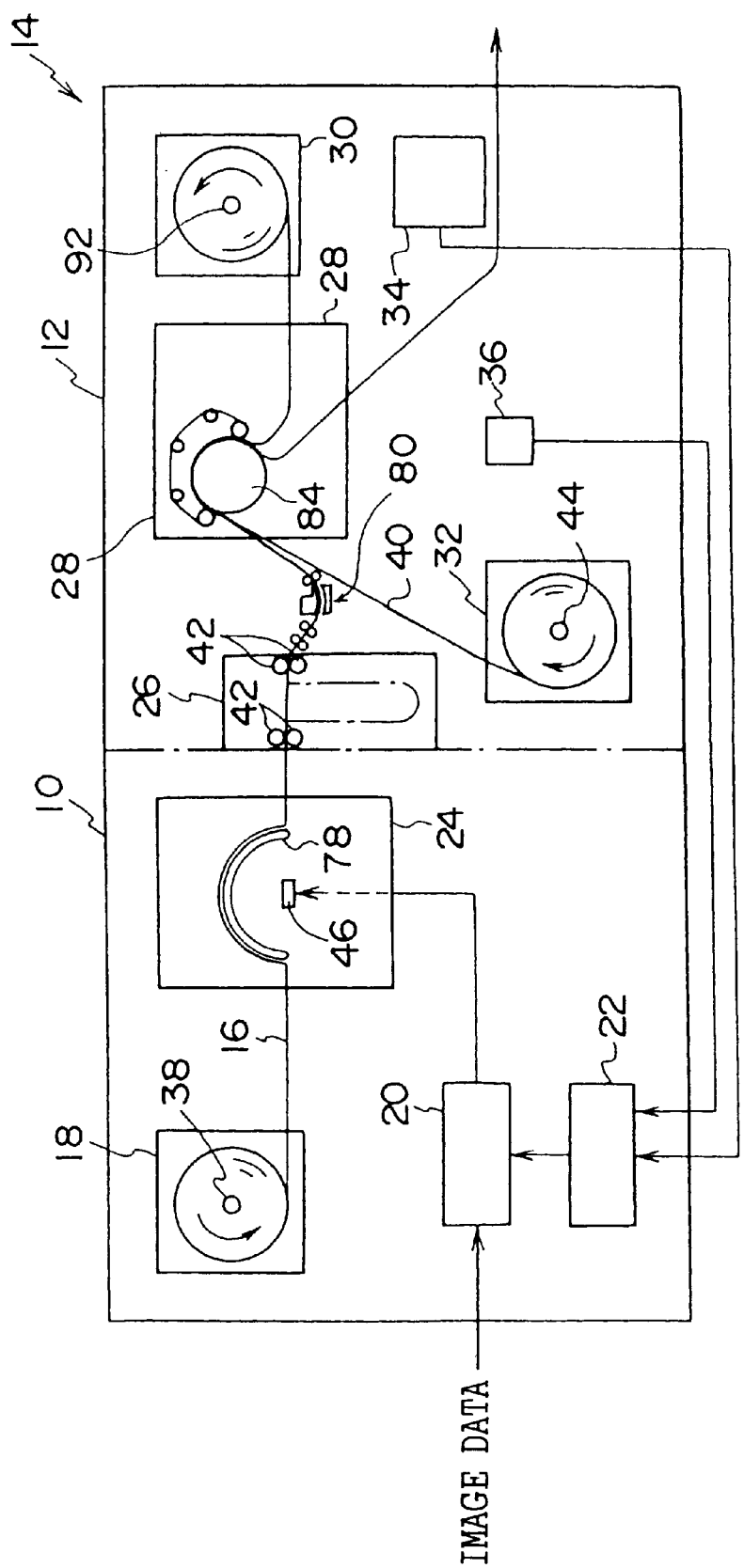
FIG. 1 is a schematic structural view illustrating the internal structure of an image forming apparatus according to an embodiment of the present invention.

With reference to the drawings, a detailed description of an example of an embodiment of the present invention will be given hereinafter. An image forming apparatus 14 according to the present embodiment is shown in FIG. 1.

The image forming apparatus 14 comprises an image exposure device 10 and a heat-developing apparatus 12.

The image exposure device 10 has a photosensitive material loading portion 18, a correction circuit 20, a correction data generating portion 22, and an exposure unit 24. Further, the heat-developing apparatus 12 comprises a face portion 26, a heat-developing unit 28, a photosensitive material take-up portion 30, an image receiving paper feeding and loading portion 32, a colorimetry (color measuring) apparatus 34, and a temperature-humidity sensor 36.

A photosensitive material 16 wound around a take-up shaft 38 is loaded in the photosensitive material loading portion 18 of the image exposure device 10. The photosensitive material 16 loaded in the photosensitive material loading portion 18 is conveyed in a predetermined direction by the driving of unillustrated rollers. An exposure unit 24 is disposed at a photosensitive material conveying direction downstream side of the photosensitive material loading portion 18. A laser 46 is disposed in the exposure unit 24, and a light beam is emitted from an unillustrated laser head thereof. An output end of the correction circuit 20 that corrects image data is connected to the laser 46. Correction image data generated at the correction data generating portion 22 is outputted from the correction circuit 20 to the laser 46. Namely, the exposure unit 24 is designed such that driving of the laser 46 is instructed on the basis of the correction image data. The exposure unit 24 exposes the photosensitive material 16 by scanning the light beam. As a result, an image is formed on the photosensitive material 16.

A circular arcuate drum 78 whose central angle is about 180° is disposed in the exposure unit 24. The photosensitive material 16 is conveyed along an inner circumferential surface of the drum 78. The exposure unit 24 is structured such that the photosensitive material 16 is irradiated with a light beam transmitted from an inner circumferential direction side of the drum 78 (a so-called inner spinner system).

An output end of the correction data generating portion 22 is connected to the correction circuit 20. Output ends of the temperature-humidity sensor 36 and the colorimetry apparatus 34 which are provided at the heat-developing apparatus 12 are connected to the corrected data generating portion 22. The temperature-humidity sensor 36 is a sensor which detects temperature and humidity inside the heat-developing apparatus 12. The colorimetry apparatus 34 measures colors of an image recorded on an image receiving paper 40 which has been subjected to heat-developing processing by the heat-developing unit 28.

Test image data for calibration is stored in advance in the correction data generating portion 22. (This test image data for calibration is simply referred to as test image data hereinafter.) Accordingly, on the basis of the test image data and data detected (measured) by the temperature-humidity sensor 36 and the colorimetry apparatus 34, the correction data generating portion 22 generates correction data which is used when image data is corrected at the correction circuit 20.

An operation panel (not shown) is mounted on an upper surface of the image exposure device 10. This operation panel is used to select either of an image forming processing mode in which an ordinary image forming processing is performed and a colormetric mode in which calibration is performed.

With reference to FIG. 2, a detailed description of the internal structure of the heat-developing apparatus 12 disposed adjacent to the image exposure device 10 will be given hereinafter.

As is shown in FIG. 2, a face portion 26 is disposed in the heat-developing apparatus 12 in a vicinity of the portion at which the image exposure device 10 and the heat-developing apparatus 12 are connected. A branch guide (not shown) which is operated by a solenoid is disposed at the face portion 26. The branch guide can be switched between a horizontal state and a vertical state. When the branch guide is switched to the vertical state, the photosensitive material 16 can be made to go slack between conveying rollers 42 as is shown by an imaginary line in FIG. 2. Accordingly, the difference between the processing speed in the heat-developing apparatus 12 and the processing speed in the image exposure device 10 can be absorbed. Further, a control unit 94 is disposed at a lower portion of the heat-developing apparatus 12 and controls driving of the conveying rollers 42.

The image receiving paper feeding and loading portion 32 is disposed beneath the face portion 26. The image receiving paper 40, which is taken up around a take-up shaft 44, is loaded in the image receiving paper feeding and loading portion 32 and then conveyed by the conveying rollers 42 in a predetermined direction.

The heat-developing unit 28 is disposed at a downstream side in the direction in which the photosensitive material 16 is conveyed, and is provided with a water application portion 80 which is filled with water which serves as an image forming solvent.

From a water tank 82 disposed at a lower portion of the heat-developing apparatus 12, water is supplied to the water application portion 80 through a pump (not shown). Water is applied to the photosensitive material 16, thus enabling a closer, tighter fit between the image receiving paper 40 and the photosensitive material 16 when they are superposed.

In addition to the water application portion 80, a heat-developing drum 84 which rotates in the direction of arrow A shown in FIG. 2 is also disposed in the heat-developing unit 28. A heater 100 is accommodated in the heat-developing drum 84 at a central portion thereof. Namely, the heat-developing drum 84 is heated by the heater 100.

Accordingly, the photosensitive material 16 and the image receiving paper 40, which are conveyed along an outer circumferential surface of the heat-developing drum 84, are heated for a predetermined time (i.e., the photosensitive material 16 and the image receiving paper 40 are subjected to the heat-developing processing). As a result, an image is formed on the image receiving paper 40. Further, a deviation prevention belt 86 is disposed in a vicinity of the outer circumference of the heat-developing drum 84 in order to prevent deviation between the photosensitive material 16 and the image receiving paper 40 being conveyed along the outer circumference of the heat-developing drum 84. In this way, an image can be formed accurately on the image receiving paper 40.

A photosensitive material peel-off member 88 and an image receiving paper peel-off member 90 are disposed at the heat-developing drum 84 at a downstream side in a direction in which the photosensitive material 16 and the image receiving paper 40 are conveyed. The photosensitive material peel-off member 88 peels the photosensitive material 16 off from the image receiving paper 40 with which the photosensitive material 16 has been superposed. The image receiving paper peel-off member 90 peels the image receiving paper 40 off from the heat-developing drum 84.

The photosensitive material 16, which has been peeled off from the image receiving paper 40 by the photosensitive material peel-off member 88, is taken up by a take-up shaft 92 which is disposed at a photosensitive material take-up portion 30, and is then processed as a waste material. Further, the colorimetry apparatus 34 is disposed at a downstream side in the conveying direction of the image receiving paper 40 which has been peeled off from the heat-developing drum 84 by the image receiving paper peel-off member 90 and which has an image formed thereon. The colorimetry apparatus 34 will be described later in more detail.

In a case in which the aforementioned operation panel is used to select the image forming processing mode, the image receiving paper 40 is passed through the colorimetry apparatus 34 as it is, and then discharged to the exterior of the heat-developing apparatus 12.

In a case in which the operational panel is used to select the colorimetry mode, a test image is formed on the image receiving paper 40 on the basis of the above-described test image data. The colorimetry apparatus 34 measures colors of this test image formed on the image receiving paper 40. At this time, since the colorimetry apparatus 34 is accommodated in the heat-developing apparatus 12, the colorimetry apparatus 34 can perform colorimetry of this test image without being affected by external light The obtained colorimetry data is transmitted to the correction data generating portion 22. The image receiving paper 40, which has been subjected to colorimetry by the colorimetry apparatus 34, is discharged to the exterior of the heat-developing apparatus 12.

FIG. 3 shows the image receiving paper 40 having the test image formed thereon. Arrow B shown in FIG. 3 indicates the direction the image receiving paper 40 is conveyed in the colorimetry apparatus 34, i.e., points toward the upper portion of the image receiving paper 40.

A test image 102 is printed at a central portion of the image receiving paper 40. This test image 102 corresponds to the above-described test image data for calibration stored in the correction data generating portion 22.

An upper end portion of the test image 102 corresponds to a position at which image writing begins by the laser 46. Further, the left-right direction in FIG. 3 (i.e., the transverse direction of the image receiving paper 40, referred to as the "widthwise direction of the image receiving paper 40" hereinafter) corresponds to the axial direction of the heat-developing drum 84. Moreover, data stored in the leading address of the storage region for storing the test image data in the correction data generating portion 22 corresponds to the upper right portion of this test image 102.

A plurality of density regions 103 (which are referred to as "patches" hereinafter) are formed at the test image 102. The patches 103 are arranged such that the colors of the patches 103 are respectively different (i.e., the patches 103 are so-called color patches). Alternatively, the patches 103 may be so-called gray patches which are shaded in respectively different shades of gray and arranged so as to exhibit a gradation of gray.

Upward of a position at which the test image 102 is printed, a first reference line 104 is printed in black along a widthwise direction of the image receiving paper 40. A distance of a predetermined length T1 is provided between this first reference line 104 and the test image 102. On the basis of the first reference line 104, the position at which the test image 102 is printed in a lengthwise direction of the image receiving paper 40, i.e., the position at which image writing by the laser 46 begins (an irradiation beginning position by the laser), can be determined.

At the left or right of the position at which the test image 102 is printed, a second reference line 106 is printed in black in a direction in which the image receiving paper 40 is conveyed. In the present embodiment, the second reference line 106 is printed to the right of the test image 102. A distance of a predetermined length T2 is provided between this second reference line 106 and the test image 102. On the basis of the second reference line 106, the position at which the test image 102 is printed in a widthwise direction of the image receiving paper 40 can be determined. Accordingly, the position at which the test image 102 is printed in the widthwise direction of the image receiving paper 40 and the aforementioned position of the heat-developing drum 84 in an axial direction thereof can be made to correspond to each other.

The first reference line 104 and the second reference line 106, together with the test image data, are written onto the photosensitive material 16 at the above-described exposure unit 24. Accordingly, the test image 102, the first reference line 104, and the second reference 106 on the image receiving paper 40 are always (each time) disposed at the same position relative to one another.

The structure of the colorimetry apparatus 34 will be explained hereinafter. A schematic cross-sectional view of the colorimetry apparatus 34, a schematic side view thereof, and a schematic bottom view thereof are shown in FIGS. 4, 5, and 6, respectively.

Figure 4:
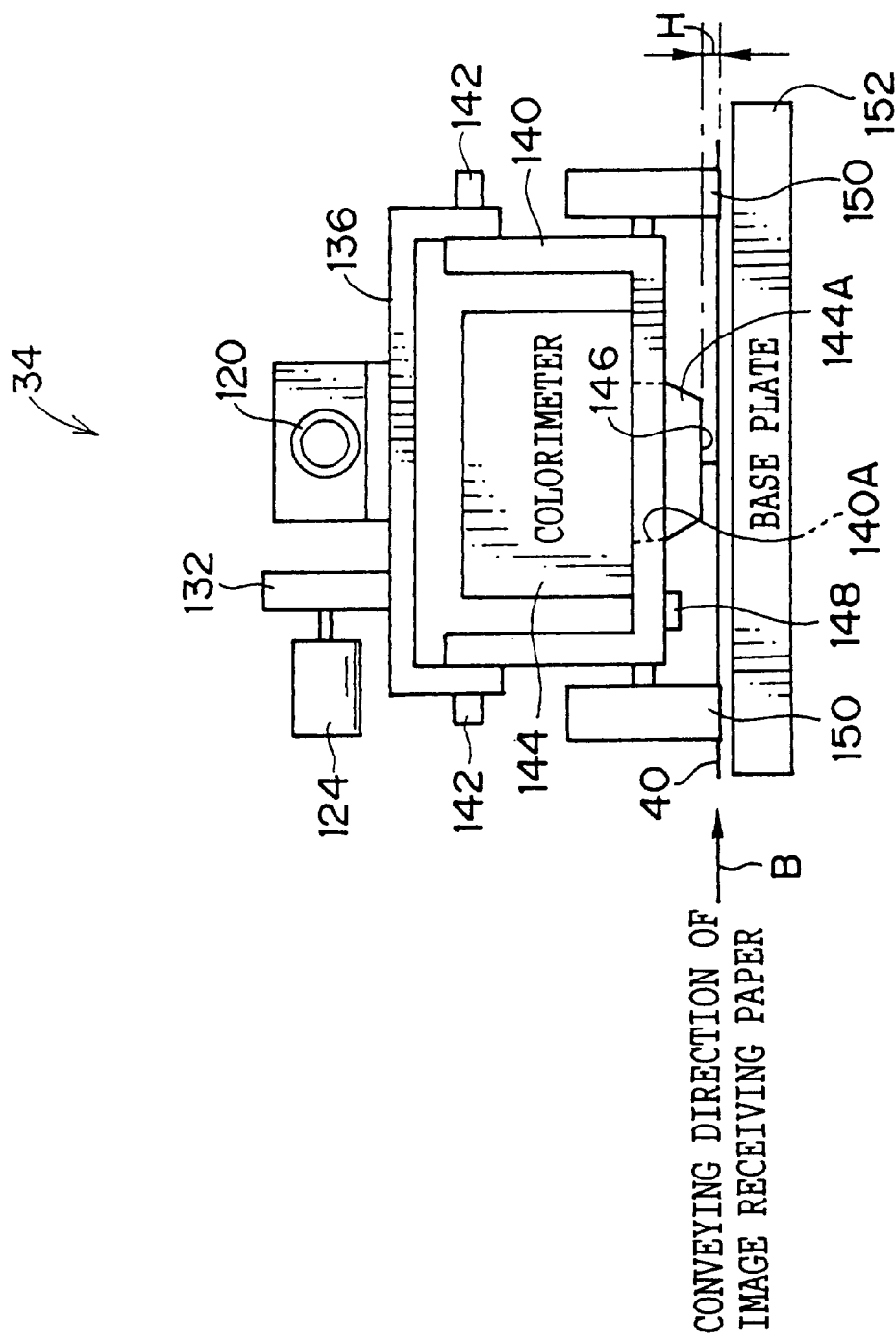
FIG. 4 is a schematic cross-sectional view of a colorimetry apparatus.
Figure 5:
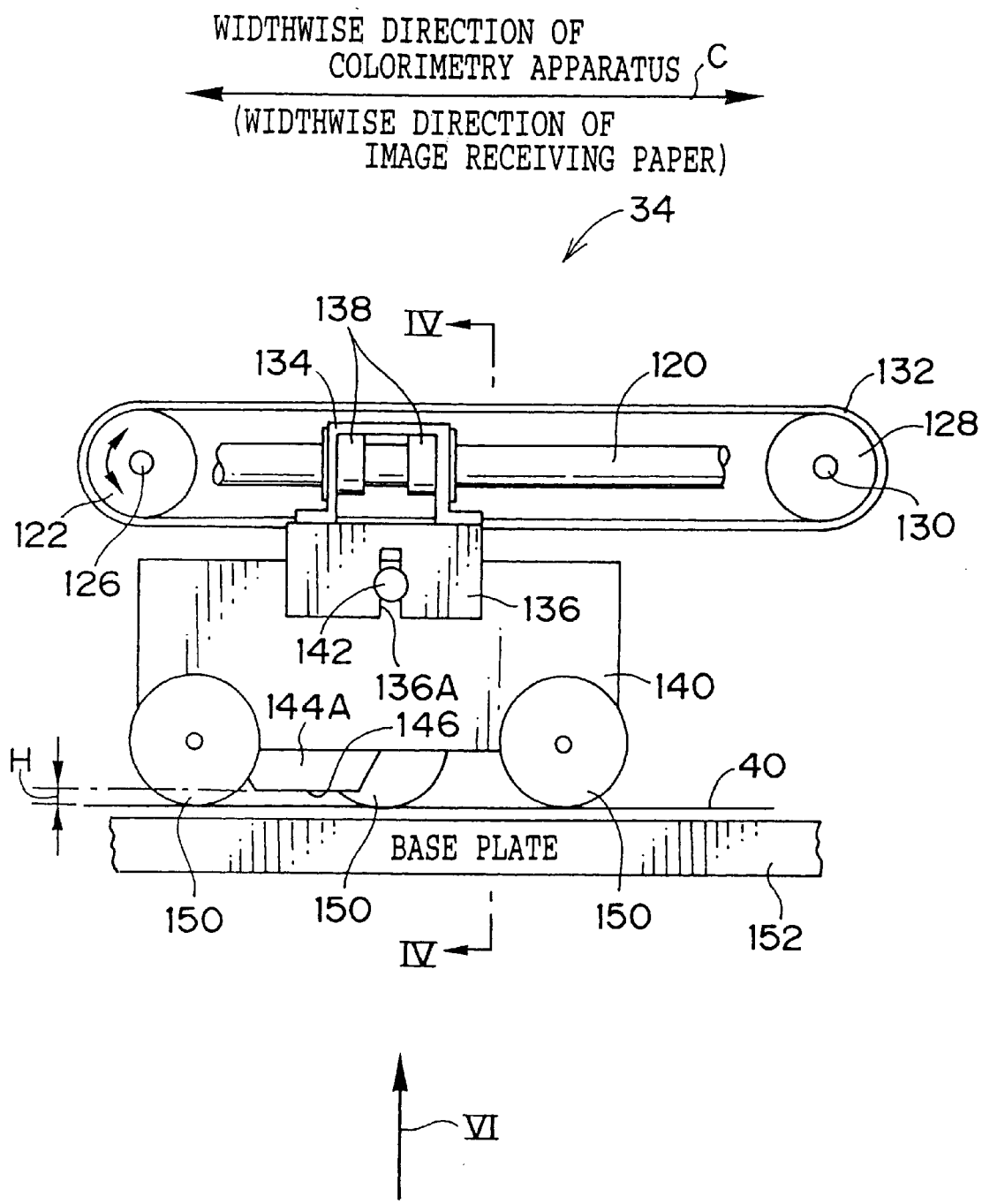
FIG. 5 is a schematic side view of the colorimetry apparatus.
Figure 6:
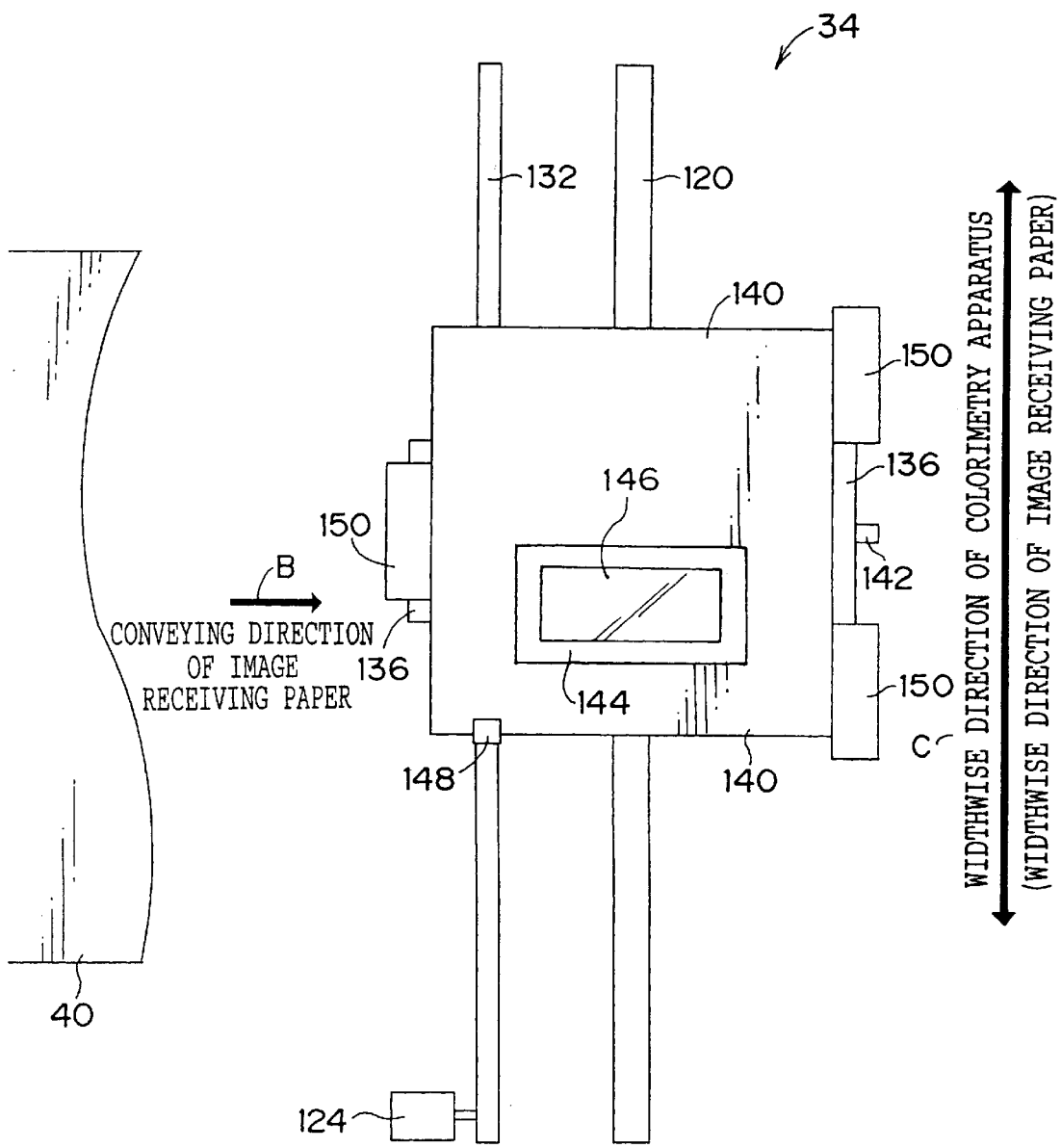
FIG. 6 is a schematic bottom view of the colorimetry apparatus.

As is shown in FIGS. 4 and 5, a box-shaped casing 140 whose upper side is opened is provided at the colorimetry apparatus 34. A base plate 152 is disposed so as to face a bottom surface of this casing 140. The above-described image receiving paper 40 is guided between the base plate 152 and the casing 140 and conveyed from a leading edge portion thereof in a direction of arrow B which is shown in FIG. 4.

The axial direction central portion of the bottom surface of the casing 140 at one transverse direction (arrow C direction in FIGS. 5 and 6) end portion of the colorimetry apparatus 34 (i.e., the left end portion in FIG. 5) is cut out in a rectangular shape to form a through hole 140A. The bottom central portion which is formed into a tapered shape (and which is referred to as a "measurement portion 144A" hereinafter), of a colorimeter 144 is fitted into the through hole 140A. The colorimeter 144 is mounted to the casing 140 with the measurement portion 144A protruding from the bottom surface of the casing 140.

A measurement surface 146 is formed at a bottom surface of the measurement portion 144A of the colorimeter 144 and measures colors of an image which is formed on the image receiving paper 40 which has been guided beneath the colorimeter 144. Further, at the colorimeter 144, the image receiving paper 40 is irradiated with light, and the light reflected from the image receiving paper 40 is detected (i.e., so-called spectral tristimulus values are detected). On the basis of results of this detection, a lightness index $L^*$ and perceived chromaticities $a^*$ and $b^*$ in an $L^*a^*b^*$ color space are determined so that the chromaticity is measured.

A reflective photosensor 148 is mounted at a bottom surface end portion of the casing 140 at a widthwise direction end portion thereof so as to face downward. The reflective photosensor 148 receives the light which has been emitted therefrom and then reflected by the image receiving paper 40, and then causes flow of an electric current in an amount corresponding to the amount of the reflected light received by the reflective photosensor 148. By measuring the electric current value, the density of the image formed on the image receiving paper 40 can be measured. In the present embodiment, the characteristic that the color black does not reflect light is made use of, and the first reference line 104 and the second reference line 106 are detected due to no reflected light being detected by the reflective photosensor 148.

A metal bearing 150 is mounted at each of the end portions of a side surface of the casing 140 which is parallel to the widthwise direction of the colorimetry apparatus 34 (i.e., the side surface at a right-hand side of FIG. 4 and at a front side of FIG. 5). Further, a bearing 150 is mounted to a central portion of the other side surface of the casing 140 (i.e., the side surface at a left-hand side of FIG. 4 and at a back side of FIG. 5).

These bearings 150 support the casing 140 such that a distance H (referred to as a "measurement distance" hereinafter) between the measurement surface 146 of the colorimeter 144 and the image receiving paper 40 is maintained at a predetermined value (5 mm±25 $\mu$m in the present embodiment). Further, the casing 140 is supported by the bearings 150 at three points which are able to provide a maximum stability, and is moved due to rotation of these bearings 150 so as to measure colors of an image formed on the image receiving paper 40. At this time, even if the base plate 152 is somewhat curved, since the casing 140 can move in conformity with the curve, the measurement distance H hardly changes.

Since the bearings 150 press the image receiving paper 40 down onto the base plate 152 at three points, even if the image receiving paper 40 curls, the curl is stretched out and the image receiving paper 40 can thereby be kept in close contact with the base plate 152.

Bolts 142 are mounted respectively at central portions of upper portions of both side surfaces of the casing 140, which side surfaces are parallel to the widthwise direction of the colorimetry apparatus 34.

A cover body 136 is mounted at an upper portion of the casing 140, and has a substantially U-shaped cross section whose opening faces downward. Each of the central portions of the side surfaces of the cover body 136 is cut out downwardly at a predetermined width so as to form a cut-out portion 136A. The vertical direction dimension of the cut-out portion 136A is approximately ¾ of the vertical direction dimension of the side surface of the cover body 136. The aforementioned bolts 142 are held in by the cut-out portions 136A so that the cover body 136 engages with the casing 140.

Accordingly, the casing 140 is fixed to the cover body 136 in the widthwise direction of the colorimetry apparatus 34. Further, the casing 140 can move freely in a vertical direction by an amount which is the height of the cut-out portions 136A. Namely, vertical concave and convex portions of the base plate 152 or the image receiving paper 40, or variations in thickness of the image receiving paper 40 can be absorbed by these cut-out portions 136A.

A shaft 120 whose length is greater than a width of the image receiving paper 40 is disposed at an upper central portion of the cover body 136 so as to be parallel to the widthwise direction of the colorimetry apparatus 34. The shaft 120 is fit with play into a pair of bushings 138 each of which is formed in a circular shape. The pair of bushings 138 and the cover body 136 are connected to each other by a connecting member 134. Accordingly, the moving direction of the casing 140 is kept in the widthwise direction of the colorimetry apparatus 34 by the shaft 120, thus allowing the colorimeter 144 to move only in the widthwise direction of the image receiving paper 40.

A belt roller 122 (at the left-hand side in FIG. 5) on shaft 126 and a belt roller 128 (at the right-hand side in FIG. 5) on shaft 130 are disposed above the cover body 136 so as to be spaced apart from each other, along the widthwise direction of the colorimetry apparatus 34, at a distance that is greater than a width of the image receiving paper 40. The belt roller 122 is rotated due to driving force of a motor 124 connected thereto.

A timing belt 132 is entrained around the belt rollers 122 and 128 so as to form a loop shape. A portion of this timing belt 132 is mounted to an end portion, in a direction intersecting the widthwise direction of the colorimetry apparatus 34, of the top surface of the cover body 136. Namely, a portion of the timing belt 132 is mounted to the left-side end portion (as seen in FIG. 4) of the top surface of the cover body 136.

In accordance with rotation of the belt roller 122 due to driving of the motor 124, the casing 140 moves in the widthwise direction of the colorimetry apparatus 34, together with the timing belt 132. Namely, due to the driving of the motor 124, the colorimeter 144 can be moved in the widthwise direction of the image receiving paper 40.

Figure 7:
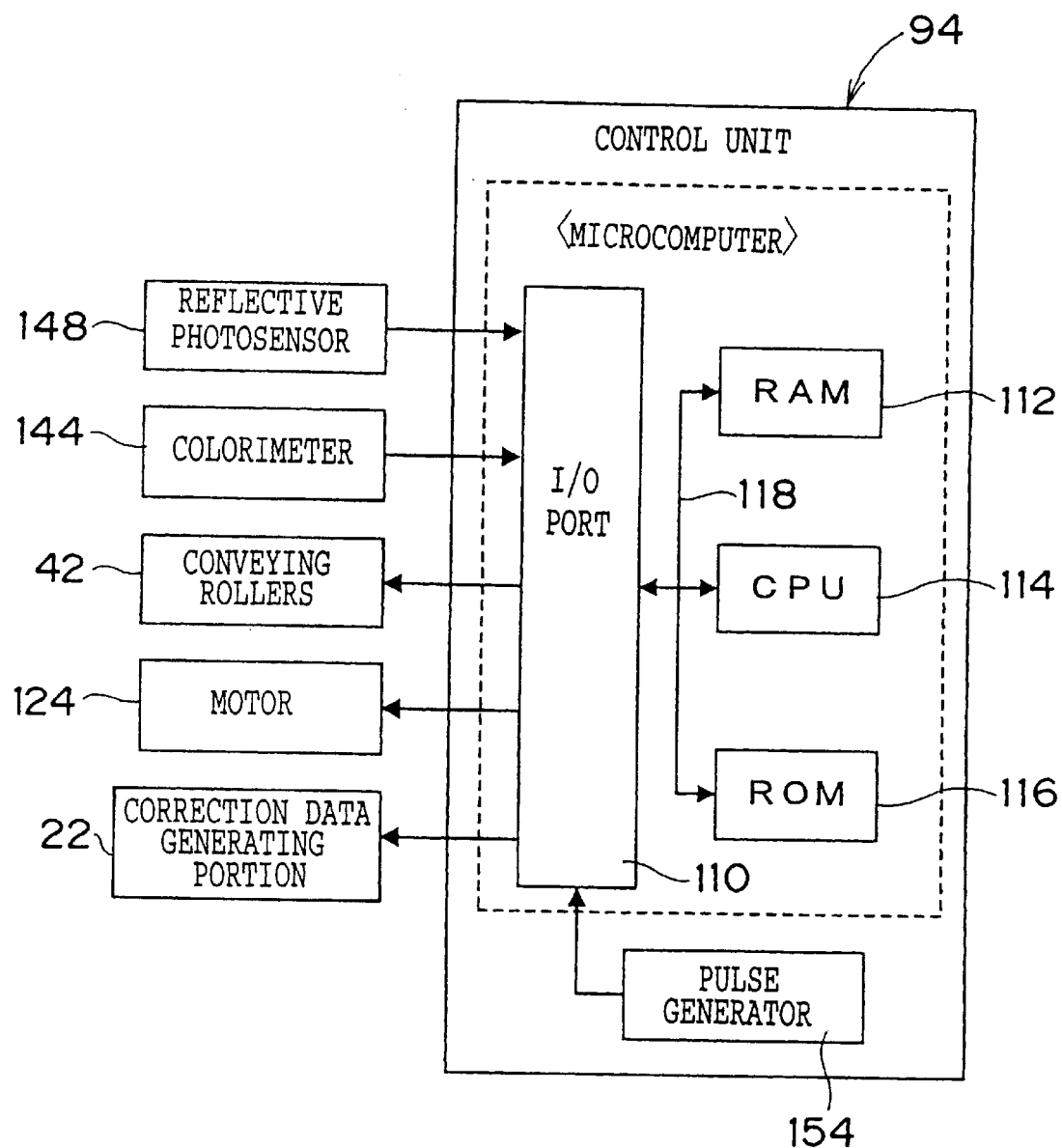
FIG. 7 is a block view of a control unit that controls operations of the colorimetry apparatus.

The driving of the motor 124 is controlled by a control unit 94. The control unit 94 will be explained with reference to FIG. 7.

The control unit 94 has a microcomputer built therein. This microcomputer comprises an I/O port 110, a RAM 112, a CPU 114, and a ROM 116 which are connected to each other via a bus 118.

The reflective photosensor 148 and the colorimeter 144 of the colorimetry apparatus 34 are connected to an input side of the I/O port 110. Results of detection of densities by using the reflective photosensor 148, and colorimetric results of the test image 102 measured by using the colorimeter 144 are inputted to the control unit 94.

Further, a pulse generator 154, which is built-in in the control unit 94 and which outputs a pulse signal having a predetermined frequency, is also connected to the input side of the I/O port 110. The conveying rollers 42, the motor 124, and the correction data generating portion 22 are connected to an output side of the I/O port 110.

Results of detection of densities by the reflective photosensor 148 and results of detection of colorimetry by the colorimeter 144 are stored in the RAM 112 at any time when needed.

A predetermined number of pulses N1 which is generated by the pulse generator 154 and which corresponds to a time required to convey the image receiving paper 40 by a predetermined length T1 is stored in the ROM 116.

A predetermined number of pulses N2 which is generated by the pulse generator 154 and which corresponds to the time required to convey the colorimeter 144 by a predetermined length T2 is also stored in the ROM 116.

A length size and a width size of the test image 102 are also stored in the ROM 116.

A time over which the reflective photosensor 148 continues to detect the first reference line 104 when the first reference line 104 is inclined with respect to the image receiving paper 40 within a maximum allowable range is also stored in the ROM 116 (this time is referred to as the "predetermined time").

The CPU 114 controls the driving of the motor 124, and the timing at which the colorimeter 144 begins to move in a widthwise direction thereof, and the distance over which the colorimeter 144 moves. Further, the CPU 114 controls the rotational speed of the motor 124 so as to maintain the moving speed of the colorimeter 144 at a predetermined speed. Moreover, the distance over which the image receiving paper 40 is conveyed, and a distance over which the colorimeter 144 is moved can be determined by counting the pulses generated by the pulse generator 154. The count values of the pulses are updated anytime and then stored in the RAM 112.

The CPU 114 controls the driving of the conveying rollers 42, the timing at which conveying of the image receiving paper 40 begins/stops, and the distance over which the image receiving paper 40 is conveyed. Further, the CPU 114 controls the rotational speed of the conveying rollers 42 so as to maintain the conveying speed of the image receiving paper 40 at a predetermined speed.

On the basis of the results of density measurement by the colorimeter 144 for each patch 103, the CPU 114 determines the lightness index L* and the chromaticnesses a* and b* in the L*a*b* color space, and stores the determined values in the RAM 112. Further, in the sequential order in which the densities are measured, the data of the lightness index L* and the chromaticnesses a* and b*(which is referred to hereinafter as "colorimetric data") is fetched and then transmitted to the correction data generating portion 22.

On the basis of results of detection (i.e., the existence or lack thereof of a reflected light) by using the reflective photosensor 148, the CPU 114 determines whether the reflective photosensor 148 has detected a black color, i.e., whether the reflective photosensor 148 has detected the first reference line 104 or the second reference line 106.

When the reflective photosensor 148 is detecting the first reference line 104, the CPU 114 measures the time over which the reflective photosensor 148 continues to detect the first reference line 104 when the colorimeter 144 is moved in the widthwise direction of the colorimetry apparatus 34. Further, by comparing this measured time with a predetermined time which has been stored in the ROM 116, the CPU 114 determines whether inclination of the first reference line 104 with respect to the image receiving paper 40 is within the maximum allowable range.

If the inclination of the first reference line 104 with respect to the image receiving paper 40 exceeds the maximum allowable range, the CPU 114 judges that accurate calibration cannot be carried out, and stops the calibration operation. Further, the CPU 114 displays an error message on the unillustrated operation panel of the image forming apparatus 14, and outputs a warning sound.

Next, operation of the present embodiment will be explained.

The flow of the image forming processing carried out by the image forming apparatus 14 will be explained.

In the image exposure device 10, the photosensitive material 16 loaded in the photosensitive material loading portion 18 is conveyed to the exposure unit 24 by the unillustrated conveying rollers being driven. On the basis of correction image data, the exposure unit 24 scans and exposes the photosensitive material 16 with a light beam. Namely, the photosensitive material 16 is conveyed along the inner circumferential surface of the circular arcuate drum 78 whose central angle is about 180° and which is disposed in the exposure unit 24, and the photosensitive material 16 is irradiated with a light beam from an inner circumferential direction of the drum 78.

The photosensitive material 16 is conveyed to the face portion 26 which is disposed in a vicinity of the portion at which the heat-developing apparatus 12 and the image exposure device 10 are connected. Water is applied to the photosensitive material 16 at the water application portion 80 which belongs to the heat-developing unit 28. The photosensitive material 16 is then sent to the heat-developing drum 84.

The photosensitive material 16 and the image receiving paper 40, which are conveyed along an outer circumferential surface of the heat-developing drum 84 whose temperature has become suitable for heat-developing processing, are heated for a predetermined time, thus forming an image on the image receiving paper 40.

The photosensitive material 16, which has been peeled off from the image receiving paper 40 by the photosensitive material peel-off member 88, is taken up onto the take-up shaft 92 of the photosensitive material take-up portion 30, and is processed as a waste material. Further, the image receiving paper 40 is peeled off from the heat-developing drum 84 by the image receiving paper peel-off member 90. Having passed through the colorimetry apparatus 34, the image receiving paper 40 is discharged to the exterior of the heat-developing apparatus 12.

If there is non-uniformity of temperature of the heat-developing drum 84, colors of the image formed on the image receiving paper 40 by the image forming processing become uneven (non-uniform). In order to eliminate this color unevenness, the image forming apparatus 14 is provided with the calibration function. Next, a description of calibration processing will be given hereinafter.

When the user operates the unillustrated operation panel of the image forming apparatus 14 to select the colorimetric mode, the image forming apparatus 14 begins calibration processing.

First, in the image exposure device 10, in the same manner as in the above-described image forming processing, the first reference line 104 and the second reference line 106, as well as the test image for calibration stored in the image forming apparatus 14 (see FIG. 3), are written on the photosensitive material 16.

Next, in the heat-developing apparatus 12, in the same manner as in the above-described image forming processing, the photosensitive material 16 and the image receiving paper 40 are conveyed along the outer circumferential surface of the heat-developing drum 84 whose temperature has become appropriate for the heat-developing processing. Accordingly, the photosensitive material 16 and the image receiving paper 40 are heated for a predetermined time, thus forming the test image, the first reference line 104, and the second reference line 106 on the image receiving paper 40.

The photosensitive material 16, which has been peeled off from the image receiving paper 40 by the photosensitive material peel-off member 88, is taken up onto the take-up shaft 92 of the photosensitive material take-up portion 30, and is processed as a waste material. Further, the image receiving paper 40 is peeled off from the heat-developing drum 84 by the image receiving paper peel-off member 90 and then conveyed to the colorimetry apparatus 34. In the colorimetry apparatus 34, colorimetry of the test image 102 which is formed on the image receiving paper 40 is performed. Namely, the color of each of the patches 103 is measured.

Figure 8:
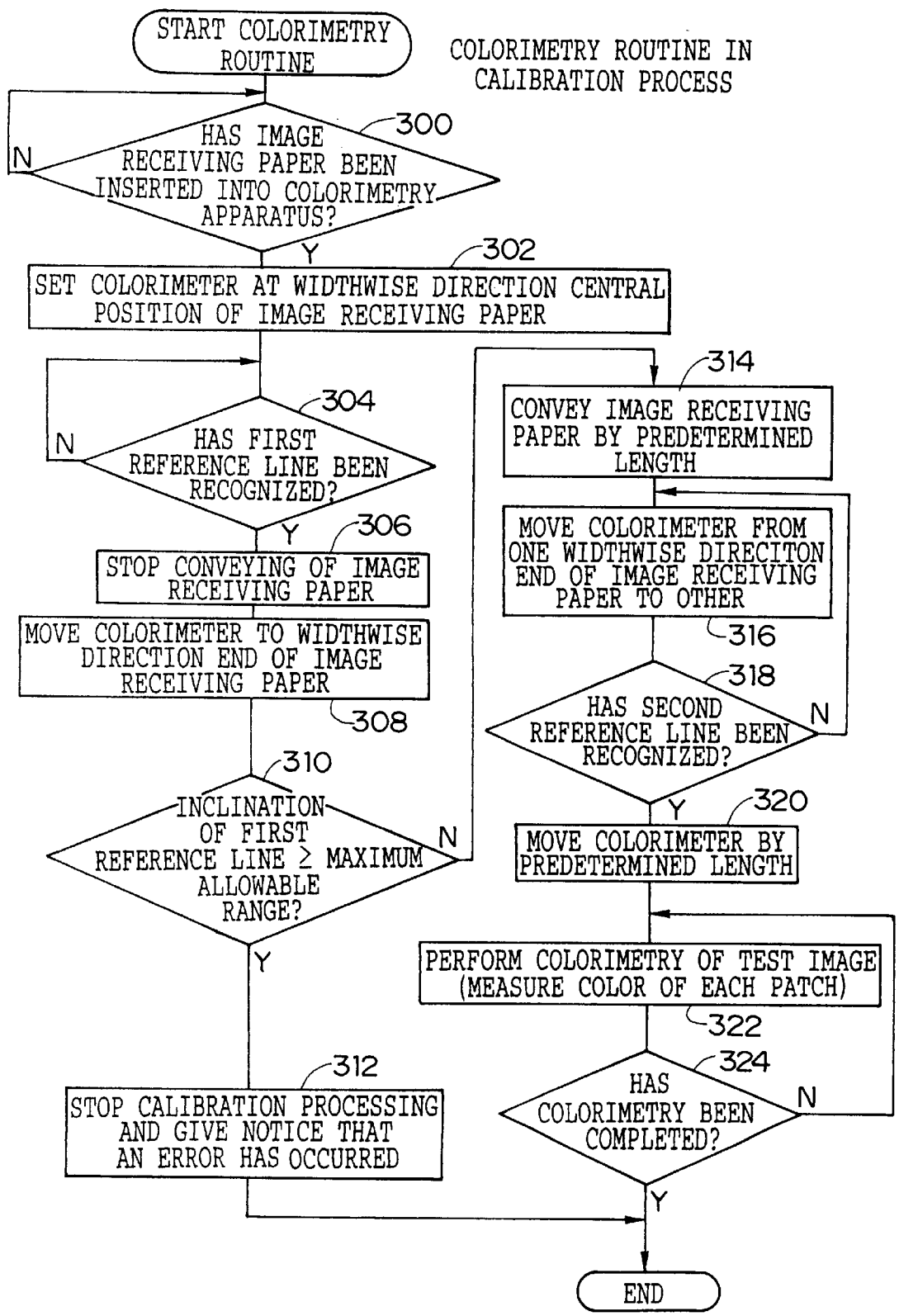
FIG. 8 is a flowchart illustrating a calibration control routine.

Next, with reference to the flowchart in FIG. 8, colorimetric control by the colorimetry apparatus 34 will be explained.

In step 300, it is determined whether the image receiving paper 40 has been inserted into the colorimetry apparatus 34. When it is detected that the image receiving paper 40 has been inserted into the colorimetry apparatus 34, the routine proceeds to step 302. The means for this determination is not particularly limited. For example, a sensor for detecting the image receiving paper 40 may be disposed in a vicinity of an insertion opening (not shown), into which the image receiving paper 40 is inserted, in the colorimetry apparatus 34. On the basis of the results of detection by this sensor, it can be determined whether the image receiving paper 40 has been inserted into the colorimetry apparatus 34. Or, since the image receiving paper 40 is conveyed in the colorimetry apparatus 34 at a predetermined speed, the time which has elapsed from the time at which the heat-developing processing begins may be measured by the pulse generator 154, and after a predetermined time has elapsed, it can be judged that the image receiving paper 40 has been inserted into the colorimetry apparatus 34.

Figure 9:
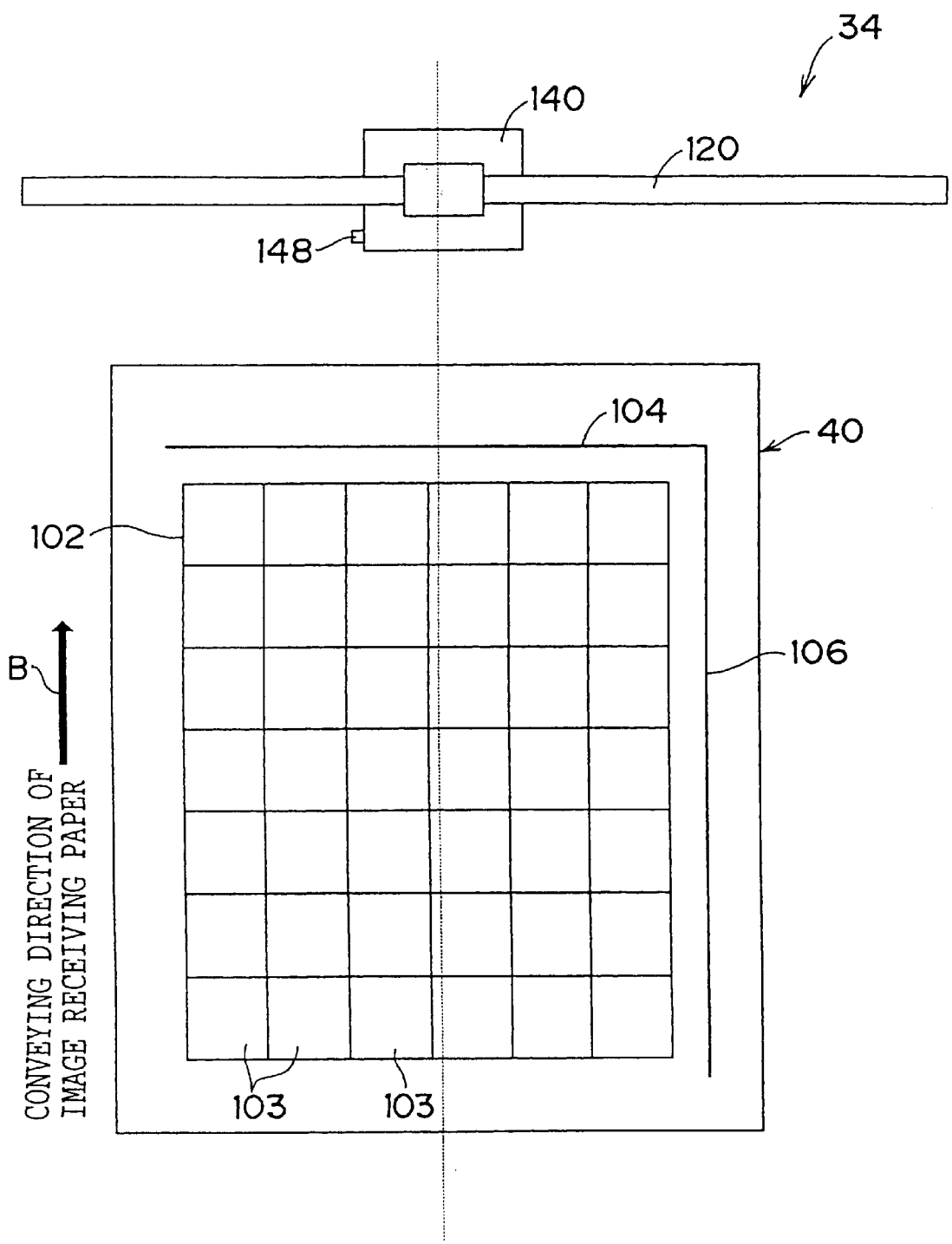
FIG. 9 is a schematic top view of the colorimetry apparatus and schematically illustrates a state in which the colorimeter detects a first reference line.

In step 302, the motor 124 is driven so as to move and set the colorimeter 144 at a widthwise direction central position of the image receiving paper 40. Further, even after having been inserted into the colorimetry apparatus 34, the image receiving paper 40 is always conveyed at a predetermined speed. The colorimeter 144 and the image receiving paper 40 at this time are shown in FIG. 9. As can be seen from FIG. 9, by the image receiving paper 40 being conveyed in a direction of arrow B, the reflective photosensor 148 which is mounted to the colorimeter 144 scans the substantially central portion of the image receiving paper 40 in the widthwise direction thereof from a leading end portion to a trailing end portion thereof (i.e., from the upper end to the lower end in FIG. 9).

In step 304, on the basis of the results of detection by the reflective photosensor 148, that is, due to the existence or lack thereof of reflected light to be detected, it is determined whether the reflective photosensor 148 has detected the first reference line 104. At this point, when reflected light is no longer detected by the reflective photosensor 148, it is judged that the first reference line 104 has been detected.

If the determination in step 304 is negative, the routine returns to step 302. Namely, the conveying of the image receiving paper 40 at a predetermined speed continues until the reflective photosensor 148 detects the first reference line 104.

Further, when the first reference line 104 is detected by the reflective photosensor 148, i.e., if the determination is affirmative in step 304, the routine proceeds to step 306.

In step 306, the conveying of the image receiving paper 40 is stopped. The image receiving paper 40 is thus stopped in a state in which the reflective photosensor 148 is detecting the first reference line 104.

In step 308, the colorimeter 144 is moved to the right end portion of the image receiving paper 40. Further, at the same time, the colorimeter 144 counts the number of pulses which are generated by the pulse generator 154 so as to measure the time over which the reflective photosensor 148 is detecting the first reference line 104. At this time, if the first reference line 104 is formed so as to be parallel to the widthwise direction of the image receiving paper 40, the reflective photosensor 148 continues to detect the first reference line 104. The larger the inclination of the first reference line 104 with respect to the image receiving paper 40, the shorter the detection time which is measured.

In step 310, the time over which the reflective photosensor 148 has detected the first reference line 104 (the time measured in step 308) and a predetermined time which has been stored in the ROM 116 are compared. It is thereby determined whether the inclination of the first reference line 104 with respect to the image receiving paper 40 i.e., the inclination of the test image 102 with respect to the image receiving paper 40, is within a maximum allowable range.

When the time measured in step 308 is shorter than the predetermined time stored in the ROM 116, it is judged that the inclination of the first reference line 104 with respect to the image receiving paper 40 is greater than or equal to the maximum allowable range, i.e., it is judged that the test image 102 formed on the image receiving paper 40 is greatly inclined with respect thereto, and the routine proceeds to step 312. If the measured time is greater than or equal to the predetermined time, it is judged that the inclination of the first reference line 104 with respect to the image receiving paper 40 is within the maximum allowable range, and the routine proceeds to step 314.

In step 312, when the test image 102 is formed on the image receiving paper 40 so as to be greatly inclined with respect thereto, it is impossible for the position at which colorimetry is carried out and the test image data which is stored in the correction data generating portion 22 to correspond to each other. Accordingly, the calibration operation is stopped. Further, an error message indicating that the colorimetry apparatus 34 is unable to carry out accurate calibration is displayed on the unillustrated operation panel of the image forming apparatus 14 and a warning sound is also outputted. In this way, it becomes possible to prevent execution of inaccurate calibration.

In step 314, the number of pulses which is generated from the pulse generator 154 is counted, and the image receiving paper 40 is conveyed at a predetermined speed until the number of pulses generated by the pulse generator 154 becomes the predetermined number of pulses N1. Accordingly, the image receiving paper 40 is conveyed by the predetermined length T1 so that the colorimeter 144 is set at an upper end portion of the test image 102 which upper end portion corresponds to the position at which writing of the test image data by the laser 46 begins.

In step 316, the colorimeter 144 is moved from a right end portion to the left at a predetermined speed. The state of the colorimeter 144 and the image receiving paper 40 at this time is as shown in FIG. 10. As can be seen from FIG. 10, the colorimeter 144 moves from the right to the left of the image receiving paper 40 (i.e., in the direction of arrow D) so that the reflective photosensor 148 mounted to the colorimeter 144 scans the image receiving paper 40 from right to left in the widthwise direction thereof, thus performing colorimetry.

In step 318, on the basis of the results of detection by the reflective photosensor 148, i.e., due to the existence or lack thereof of detected reflected light, it is determined whether the reflective photosensor 148 has detected the second reference line 106. At this point, when the reflective photosensor 148 no longer detects reflected light, it is judged that the reflective photosensor 148 has detected the second reference line 106.

If the determination is negative in step 318, the routine returns to step 316. Namely, the colorimeter 144 continues to move at a predetermined speed until the reflective photosensor 148 detects the second reference line 106.

When the second reference line 106 is detected by the reflective photosensor reflective photosensor 148, i.e., when the determination in step 318 is affirmative, the routine proceeds to step 320.

In step 320, the number of pulses which is generated by the pulse generator 154 is counted, and the colorimeter 144 moves at a predetermined speed until the number of pulses generated by the pulse generator 154 is the predetermined number of pulses N2. Accordingly, the colorimeter 144 is moved by a predetermined length T2, and is set at the right end portion of the test image 102 formed on the image receiving paper 40. Accordingly, it can be ensured that a position of the test image 102 on the image receiving paper 40 and an axial position of the heat-developing drum 84 correspond to each other.

When step 320 has been completed, the colorimeter 144 is set at the upper right end portion of the test image 102 on the image receiving paper 40. The color at the upper right end portion of the test image 102 corresponds to the data stored at the leading address in a storage region for the test image data in the correction data generating portion 22. Namely, the measurement position of the colorimeter 144 and the stored position data of the test image data are aligned with one another.

In step 322, colorimetry of the test image formed on the image receiving paper 40, i.e., colorimetry for each color patch 103, is carried out by using the colorimeter 144. In this colorimetry, the colorimeter 144 is made to move from right to left and to stop at the center of the rightmost patch 103 so as to measure the color of this patch 103. After colorimetry has been completed, the colorimeter 144 is made to move to the center portion of the patch 103 next to and at the left of the patch 103 for which the colorimetry has been completed (in the present embodiment, the distance from the center of one patch 103 to the center of the adjacent patch 103 is about 20 mm), and then colorimetry of this next patch 103 is carried out. In this way, colorimetry for each of the patches 103 which are located in the uppermost row of the test image 102 is performed by repeating the above-described operations of moving→stopping→effecting colorimetry→moving→ . . .

After the colorimetry for each of the patches 103 in the uppermost row of the test image 102 has been completed, the image receiving paper 40 is moved slightly by an amount corresponding to the length of each patch 103, and the colorimeter 144 is returned to the right end portion of the test image 102. Thereafter, the same operations of moving→stopping→effecting colorimetry→moving→ . . . as described above are repeated so that colorimetry of the patches 103 in the next row is carried out Colorimetry for all of the patches 103 of the test image on the image receiving paper 40 is performed by repeating these operations as described above.

At this time, the bearings 150 can stretch out curls in the image receiving paper 40, and the colorimeter 144 is made to move in conformity with the curvature of the base plate 152. Therefore, the colorimeter 144 can perform colorimetry with the measurement distance H between the measurement surface 146 of the colorimeter 144 and the image receiving paper 40 always being maintained at a predetermined value.

At the control unit 94, the results of colorimetry for each of the patches 103 are converted to the lightness index L* and the chromaticnesses a* and b* in the L*a*b* color space, and are transmitted, as colorimetric data, to the correction data generating portion 22.

In step 324, a determination is made whether the image receiving paper 40 has been conveyed by an amount equal to a lengthwise length of the test image 102 since the colorimetry of the patches 103 was started in step 322. Namely, a determination is made as to whether colorimetry for all of the patches 103 has been completed.

In a case in which colorimetry for all of the patches 103 has not been completed (i.e., if the determination is negative in step 324), the routine returns to step 322, where execution of colorimetry is continued.

When colorimetry for all of the patches 103 has been completed (i.e., if the determination is affirmative in step 324), colorimetry processing carried out by the colorimetry apparatus 34 is completed.

When colorimetry processing is completed, the image receiving paper 40 on which the test image for calibration has been formed is discharged to the exterior of the heat-developing apparatus 12.

The correction data generating portion 22 determines color unevenness by comparing the colorimetric data transmitted (from the control unit 94) with the test image data for calibration which is stored in advance. The color unevenness is determined by computation using the equation $\Delta E=(\Delta L^2+\Delta a^2+\Delta b^2)^{1/2}$ (wherein $\Delta E$ represents color unevenness, and $\Delta L$, $\Delta a$, and $\Delta b$ individually represent a difference between the value of a colorimetric data and a target value which is determined in advance on the basis of the test image data).

The correction data generating portion 22 generates spatial correction data so as to eliminate the determined color unevenness.

After correction data has been generated by the correction data generating portion 22, the image forming apparatus 14 automatically enters into the image forming processing mode. From that time on, in the image forming processing, correction data which has been generated at the correction data generating portion 22 so as to obtain a desired image data is spatially corrected by the correction circuit 20 so that correction image data is generated. On the basis of this correction image data, the photosensitive material 16 is irradiated with a light beam so that the image forming processing is performed.

As described above, in the present embodiment, the first reference line 104 and the second reference line 106 are exposed and formed on the photosensitive material 16 in order to specify the position where the test image 102 is formed on the image receiving paper 40. The first reference line 104 and the second reference line 106 formed on the image receiving paper 40 are detected by the reflective sensor 48 so that the position at which the test image 102 is formed on the image receiving paper 40 can be automatically determined. As a result, the test image data which is stored in advance and the measurement position of the colorimetry apparatus 34 can be made to correspond to one another accurately.

Since the colorimetry apparatus 34 is built-in in the image forming apparatus 14, it becomes possible to make the series of operations needed for calibration automatic and to shield light from entering into the colorimetry apparatus 34 from the exterior of the image forming apparatus 14. As a result, colors can be measured accurately by the colorimetry apparatus 34 without being affected by external light.

In a case in which the test image 102 formed on the image receiving paper 40 is greatly inclined with respect thereto, an error message is output and the image forming processing is stopped. As a result, execution of inaccurate calibration can be prevented. Further, as compared to a case in which the calibrator provided at the exterior of the image forming apparatus is used, since calibration can be performed actually inside the apparatus, it is thereby unnecessary to take measurement errors, which are caused by temperature difference between inside and outside the apparatus, into consideration.

Since the casing 140 is supported by the bearings 150, the measurement distance H between the measurement surface of the colorimeter 144 and the image receiving paper 40 can be maintained at a predetermined value. Further, the casing 140 is supported stably at three points of support by the bearings 150. Accordingly, it is possible to move the casing 140 naturally in conformity with curves of the base plate 52 and variations in thickness of the image receiving paper 40. As a result, the colorimetry apparatus 34 can perform colorimetry while automatically maintaining the measurement distance H at a predetermined value without using expensive computers or the like.

In the present embodiment, the reflective photosensor 148 is used when the first reference line 104 and the second reference line 106 are detected. However, the present invention is not limited to the same. Instead of this reflective photosensor 148, for example, the first reference line 104 and the second reference line 106 can be detected by using the colorimeter 144. Or, instead of the reflective photosensor 148, a densitometer can be provided so as to detect the first reference line 104 and the second reference line 106.

The colorimetry apparatus 34 is used in a state of being built-in in the image forming apparatus 14. However, the present invention is not limited to the same. Since the test image formed on the image receiving paper 40 and the position data of the test image data can be aligned accurately on the basis of the first reference line 104 and the second reference line 106, the colorimetry apparatus 34 can be used as an option of the apparatus 14 in a state of being disposed at an external portion of the image forming apparatus 14.

After the alignment has been performed by detecting the first reference line 104 and the second reference line 106, the colorimetry apparatus 34 begins colorimetry of each of the patches 103. However, the present invention is not limited to the same. For example, even after colorimetry has begun, the second reference line 106 can be detected when colorimetry is carried out for each of the patches 103 in each row of the test image. In this case, more accurate alignment and calibration can be ensured.

Alignment of the test image formed on the image receiving paper 40 and the position data of the test image data to be corrected is performed by using the first reference line 104 and the second reference line 106. However, the present invention is not limited to the same. For example, three or more reference lines can be formed on the test image. Or, instead of those reference lines, specific marks such as circles or squares can be used.

Calibration in the image forming apparatus 14 which forms color images has been explained herein. However, the present invention is not limited to the same. Calibration according to the present invention can be applied to an image forming apparatus which forms gray scale images.

In order to detect inclination of the test image 102 on the image receiving paper 40 with respect thereto, the colorimeter 144, which is set at a central position of the image receiving paper 40 in the widthwise direction thereof, is moved to the right end portion of the image receiving paper 40. However, the present invention is not limited to the same. For example, the colorimeter 144 can be made to move from the widthwise direction central position of the image receiving paper 40 to the left end portion of the image receiving paper 40, and then be made to move to the right end portion thereof. During the movement of the colorimeter 144 from the left end portion to the right end portion of the image receiving paper 40, the time over which the reflective photosensor 148 has been detecting the first reference line 104 is measured so that the inclination of the test image 102 with respect to the image receiving paper 40 can be measured with high accuracy.

Each time when colorimetry for the patches 103 in a row is completed, the image receiving paper 40 is conveyed slightly so that colorimetry for the entire region of the test image 102 is carried out However, the present invention is not limited to the same. For example, colorimetry for the respective patches 103 can be carried out while the image receiving paper 40 is continuously conveyed at a predetermined speed.

The metal bearings 150 are used to support the colorimetry apparatus 34 to move on the image receiving paper 40. However, the present invention is not limited to the same. If damage to the surface of the image receiving paper 40 is a matter of concern, bearings or rollers which are made from resin or rubber materials can be used. Or, circumferential surfaces of members contacting the image receiving paper 40 can be covered with resin or rubber.

The number of the bearings 150 and the positions where the bearings 150 are mounted to the casing 140 are not particularly limited provided that the bearings 150 are able to support the casing 140 stably.

Further, in the present embodiment, alignment of the colorimeter and the test image has been performed by using the first reference line 104 and the second reference line 106 as marks. However, alignment can also be performed by using one of these reference lines 104 and 106 in combination with moving pulses generated from the colorimeter 144.

It is a main object of the present invention to perform a calibration inside the image forming apparatus. By doing this, calibration is carried out almost under the same circumstances as in an actual image recording processing. Accordingly, measurement errors due to environmental difference can be cancelled, and alignment of a recording material (i.e., an image receiving material) having the test image recorded thereon is facilitated. As a result, in the present embodiment, an object to be corrected was an exposure amount of the image receiving material (or the recording material). However, the present invention is not limited to the same. For example, if the control of temperature of the heat-developing drum 84 is performed with a high degree of accuracy, the resulting temperature of this drum 84 can be an object to be corrected.

Further, in the present embodiment, a heat-developing/transferring apparatus has been listed as the image forming apparatus. However, the present invention can be applied to another image forming apparatus such as a photographic printer in which images are formed by scanning a laser beam, an LED, or the like and exposing a photosensitive material, a printer in which images are formed on plain paper with toner by scanning a laser with a laser scanning system and exposing an image carrier, or images are formed by scanning a dye while discharging or spraying the dye in an ink jet spraying system, or the like.

According to the present invention, it is possible to provide an image forming apparatus which has a colorimeter which measures density or color of an image, and which is capable of realizing calibration with high accuracy.

What is claimed is:

1. An image forming apparatus having a calibration function for correcting density or color unevenness of an image, caused by non-uniformity of temperature on a surface of a heat-developing drum, on a basis of a test image which is recorded on a recording material in accordance with test image data for calibration, comprising:

detecting means for detecting marks which are formed on said recording material and which specify a position of said test image;

wherein said marks are a first line mark formed along a conveying direction of said recording material and a second line mark formed along a direction orthogonal to the conveying direction of said recording material;

measuring means for, on a basis of said marks detected by said detecting means, measuring density or color of the test image formed on said recording material due to a correspondence between said test image formed on said recording material and position data of said test image stored in advance in a storing means, to each other; and correcting means for correcting density unevenness or color unevenness of the test image by comparing results of the measurement by said measuring means and density or color of said test image data stored in advanced in said storing means.

2. An image forming apparatus according to claim 1, wherein mark data for recording said marks forms a part of said test image data.

3. An image forming apparatus according to claim 1, wherein a home position of said measuring means is determined due to a correspondence between said test image formed on said recording material and position data of said test image data stored in advance in said storing means, to each other.

4. An image forming apparatus according to claim 1, wherein said measuring means is able to move in a direction orthogonal to a conveying direction of said recording material, and is moved in said direction orthogonal to the conveying direction of said recording material while conveying said recording material so that a test image is scanned.

5. An image forming apparatus according to claim 1, wherein a home position of said measuring means is determined on a basis of a number of moving pulses generated by said detecting means when said first mark or said second mark is detected.

6. An image forming apparatus according to claim 1, wherein said correcting means corrects an exposure amount of said recording material on the basis of the results of measurement by said measuring means.

7. An image forming apparatus according to claim 1, wherein said image forming apparatus is a heat-developing/transferring apparatus in which a photosensitive material is irradiated with a light beam so as to be exposed, and in which the photosensitive material and an image receiving material are laminated to each other, and conveyed while contacting a heat-developing drum, thereby being subjected to heat-developing/transferring processing so that an image is formed on the image receiving material.

8. An image forming apparatus according to any of claims 1 to 7, wherein said detecting means has inclination measuring means for, on a basis of one of the marks, measuring an inclination of the test image formed on said recording material with respect thereto, and if the inclination measured by said inclination measuring means is at least equal to a predetermined value, said detecting means stops the measurement by said measuring means, and outputs information expressing that an error has occurred.

9. An image forming apparatus according to claim 1, wherein when said first line mark is detected, the conveyance of said recording material is stopped and an inclination of said first line mark with respect to said recording material is determined, such that if said inclination is within a maximum allowable range, said recording paper is conveyed by a predetermined length such that a colorimeter is moved to scan said recording material in a widthwise direction thereof, to perform colorimetry, before detecting said second line mark.

10. An image forming apparatus having a calibration function for correcting density or color unevenness of an image, caused by non-uniformity of temperature on a surface of a heat-developing drum, on a basis of a test image which is recorded on a recording material in accordance with test image data for calibration, comprising:

detecting means for detecting marks which are formed on said recording material and which specify a position of said test image;

wherein said marks include a first line mark formed along a conveying direction of said recording material and, if a measurement of time in detecting said first line mark is the same or greater than a predetermined period of time, an inclination of said first line mark with respect to said recording material is within a maximum allowable range, and said detecting means then detects a second line mark formed along a direction orthogonal to the conveying direction of said recording material;

measuring means for, on a basis of said marks detected by said detecting means, measuring density or color of the test image formed on said recording material due to a correspondence between said test image formed on said recording material and position data of said test image data stored in advance in a storing means, to each other; and correcting means for correcting density unevenness or color unevenness of the test image by comparing results of the measurement by said measuring means and density or color of said test image data stored in advance in said storing means.

11. An image forming apparatus having a calibration function for correcting density or color unevenness of an image, caused by non-uniformity of temperature on a surface of a heat-developing drum, on a basis of a test image which is recorded on a recording material in accordance with test image data for calibration, comprising:

a detecting device for detecting marks which are formed on said recording material and which specify a position of said test image;

wherein said marks are a first line mark formed along a conveying direction of said recording material and a second line mark formed along a direction orthogonal to the conveying direction of said recording material;

a measuring device for, on a basis of said marks detected by said detecting device, measuring density or color of the test image formed on said recording material due to a correspondence between said test image formed on said recording material and position data of said test image data stored in advance in a storing device, to each other; and a correcting device for correcting density unevenness or color unevenness of the test image by comparing results of the measurement by said measuring device and density or color of said test image data stored in advance in said storing device.

12. An image forming apparatus according to claim 11, wherein mark data for recording said marks forms a part of said test image data.

13. An image forming apparatus according to claim 11, wherein a home position of said measuring device is determined due to a correspondence between said test image formed on said recording material and position data of said test image data stored in advance in said storing device, to each other.

14. An image forming apparatus according to claim 11, wherein said measuring device is able to move in a direction orthogonal to a conveying direction of said recording material, and is moved in said direction orthogonal to the conveying direction of said recording material while conveying said recording material so that a test image is scanned.

15. An image forming apparatus according to claim 11, wherein a home position of said measuring device is determined on a basis of a number of moving pulses generated by said detecting device when said first line mark or said second line mark is detected.

16. An image forming apparatus according to claim 11, wherein said correcting device corrects an exposure amount of said recording material on the basis of the results of measurement by said measuring device.

17. An image forming apparatus according to claim 11, wherein said image forming apparatus is a heat-developing/transferring apparatus in which a photosensitive material is irradiated with a light beam so as to be exposed, and in which the photosensitive material and an image receiving material are laminated to each other, and conveyed while contacting a heat-developing drum, thereby being subjected to heat-developing/transferring processing so that an image is formed on the image receiving material.

18. An image forming apparatus according to any one of claims 11 to 17, wherein said detecting device has an inclination measuring device for, on a basis of the first line mark, measuring an inclination of the test image formed on said recording material with respect thereto, and if the inclination measured by the inclination measuring device is at least equal to a predetermined value, the detecting device stops the measurement by the measuring device, and outputs information expressing that an error has occurred.

* * * * *